(12) United States Patent
Otsuka

(10) Patent No.: US 12,522,129 B2
(45) Date of Patent: Jan. 13, 2026

(54) LAMP SYSTEM, LAMP CONTROL METHOD, LAMP CONTROL PROGRAM, AND VEHICLE

(71) Applicant: Stanley Electric Co., Ltd., Tokyo (JP)

(72) Inventor: Hideo Otsuka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/846,568

(22) PCT Filed: Mar. 2, 2023

(86) PCT No.: PCT/JP2023/007917
§ 371 (c)(1),
(2) Date: Sep. 12, 2024

(87) PCT Pub. No.: WO2023/176490
PCT Pub. Date: Sep. 21, 2023

(65) Prior Publication Data
US 2025/0214505 A1 Jul. 3, 2025

(30) Foreign Application Priority Data
Mar. 14, 2022 (JP) .................. 2022-039712

(51) Int. Cl.
*B60Q 1/14* (2006.01)
*F21S 41/64* (2018.01)
*F21S 41/663* (2018.01)

(52) U.S. Cl.
CPC .......... *B60Q 1/1423* (2013.01); *F21S 41/645* (2018.01); *F21S 41/663* (2018.01); *B60Q 2300/20* (2013.01); *B60Q 2300/42* (2013.01)

(58) Field of Classification Search
CPC .............. B60Q 1/1423; B60Q 2300/20; B60Q 2300/42; F21S 41/645; F21S 41/663;
(Continued)

(56) References Cited

U.S. PATENT DOCUMENTS 4,891,624 A * 1/1990 Ishikawa ............... G01S 17/931
356/3

FOREIGN PATENT DOCUMENTS

JP 4720758 B2 7/2011
JP 2013109911 A 6/2013
(Continued)

OTHER PUBLICATIONS

Search English translation of JP-2020106443-A (Year: 2020).*
International Preliminary Report on Patentability for PCT/JP2023/007917 dated Sep. 26, 2024.

*Primary Examiner* — Omar Rojas Cadima
(74) *Attorney, Agent, or Firm* — KENEALY VAIDYA LLP (57) ABSTRACT

Light from a headlight is prevented from being diffusely reflected on a road surface and reaching an oncoming vehicle. Provided is a lamp control method of controlling a lamp including a lamp unit that projects light over a predetermined range and a driver that turns on and turns off or dims a light projection range of the lamp unit in predetermined units. The lamp control method includes a step of obtaining a reflection region on a road surface where the light projected from the lamp unit is regularly and diffusely reflected by the road surface and reaches a driver of an oncoming vehicle or a preceding vehicle, and a step of controlling the driver so that the light projected onto the reflection region from the lamp unit is turned off or dimmed.

12 Claims, 11 Drawing Sheets

(58) Field of Classification Search
CPC ........ B60R 21/0134; B60W 2420/403; B60W 2420/408; B60W 2520/10; B60W 2552/50; B60W 30/08
See application file for complete search history.

(56) References Cited

FOREIGN PATENT DOCUMENTS

| | | | | |
|---|---|---|---|---|
| JP | 2020106443 A | * | 7/2020 | |
| WO | WO-2015093552 A1 | * | 6/2015 | ............ B60S 1/0844 |

* cited by examiner

⟶ REGULARLY REFLECTED LIGHT

------▶ DIFFUSELY REFLECTED LIGHT

FIG. 5(b)

LIGHT BEAM REACHING DRIVER OF ONCOMING VEHICLE

LIGHT DISTRIBUTION PATTERN OF
LEFT HEADLAMP 10

FIG. 8(c)

LIGHT DISTRIBUTION PATTERN OF
RIGHT HEADLAMP 20

FIG. 9

FIG. 10(a) COMPOSITION OF LIGHT DISTRIBUTION PATTERNS OF LEFT AND RIGHT HEADLAMPS

FIG. 10(b)

TURN-OFF OF LIGHT
LIGHT DISTRIBUTION PATTERN OF LEFT HEADLAMP 10

FIG. 10(c)

TURN-OFF OF LIGHT
LIGHT DISTRIBUTION PATTERN OF RIGHT HEADLAMP 20

LAMP SYSTEM, LAMP CONTROL METHOD, LAMP CONTROL PROGRAM, AND VEHICLE

PRIORITY AND INCORPORATION BY REFERENCE

This application is a U.S. National Stage Application under 35 U.S.C § 371 of International Patent Application No. PCT/JP2023/007917 filed Mar. 2, 2023, which claims the benefit of priority under 35 U.S.C. § 119 to Japanese Patent Application No. 2022-039712, filed Mar. 14, 2022, the content of which are incorporated herein by reference.

TECHNICAL FIELD

The present invention relates to a lamp system for a vehicle, and more particularly to a headlamp system.

BACKGROUND ART

In recent years, adaptive driving beam (ADB) technology for detecting the position of an oncoming vehicle and partially turning off headlights of a host vehicle so that light of the headlights is not emitted to a driver of the oncoming vehicle has been used. Thereby, it is possible to prevent the driver of the oncoming vehicle from being dazzled.

PTL 1 also discloses technology for not only turning off light that is directly emitted to oncoming vehicles, but also preventing light, which is regularly reflected from a road surface when the road surface becomes mirror-like due to rain, snow, or the like, from being emitted to oncoming vehicles. Specifically, in the technology, it is determined whether a road surface becomes mirror-like due to rain, snow, or the like, it is detected whether there are a plurality of bright spots on a straight line connecting a host vehicle on the road surface and an oncoming vehicle when the road surface becomes mirror-like, and light is turned off so as not to be emitted to a reflection region on the road surface because light regularly reflected from the road surface reaches the oncoming vehicle when there are the plurality of bright spots. Thereby, it is possible to suppress the sense of glare felt by a driver of the oncoming vehicle when the road surface becomes mirror-like due to rain, snow, or the like, and thus it is possible to further reduce the sense of glare as compared to when lights for only regions of the oncoming vehicle directly irradiated with light are turned off.

CITATION LIST

Patent Literature

PTL 1: JP4720758B

SUMMARY OF INVENTION

Technical Problem

When a road surface becomes mirror-like due to rain, snow, or the like, it is possible to suppress the sense of glare felt by a driver of an oncoming vehicle by the technology disclosed in PTL 1, but it is rare for a road surface to become mirror-like due to rain or snow in the actual environment. For example, when there is a small amount of rainfall, a road surface becomes uneven and rough due to irregularities of the road surface itself and splashing of rainwater on the road surface, and thus light emitted from headlights of a host vehicle is diffusely reflected by the irregularities of the road surface. For this reason, not only light reaching an oncoming vehicle when the light regularly reflected from a road surface but also light diffusely reflected from the surrounding region reach the oncoming vehicle, which results in a problem that a driver of the oncoming vehicle is dazzled.

An object of the present invention is to prevent light from headlights from being diffusely reflected by a road surface and reaching an oncoming vehicle.

Solution to Problem

In order to achieve the above object, the present invention provides a lamp system including a lamp unit that projects light over a predetermined range, a driver that turns on and turns off or dims a light projection range of the lamp unit in predetermined units, and a control unit that controls the driver. The control unit obtains a reflection region on a road surface where the light projected from the lamp unit is regularly and diffusely reflected by the road surface and reaches a driver of an oncoming vehicle or a preceding vehicle, and controls the driver so that the light projected onto the reflection region from the lamp unit is turned off or dimmed.

Advantageous Effects of Invention

According to the present invention, light from headlights can be prevented from being diffusely reflected by a road surface and reaching an oncoming vehicle.

BRIEF DESCRIPTION OF DRAWINGS

FIG. 2(*a*) is a diagram showing LEDs 13 arranged vertically and horizontally in a matrix in the lamp system 100 according to the first embodiment, and FIG. 2(*b*) is a diagram showing areas 130*a* and 130*b* that are set in the LEDs 13 arranged in a matrix.

FIG. 4(*a*) is a diagram showing a positional relationship between an oncoming vehicle 2 and turned-off/dimmed light of the lamp system 100 according to the first embodiment, and FIG. 4(*b*) is a diagram showing a reflection region 3 when viewed from the oncoming vehicle 2.

FIG. 5(*a*) is a diagram showing regular reflection and diffuse reflection that occur on a road surface when the amount of rainfall is small, FIG. 5(*b*) is a diagram showing the reflection region 3 where regularly reflected light and diffusely reflected light that reach a windshield of an oncoming vehicle are reflected, and FIG. 5(*c*) is a diagram showing a positional relationship between a grounding position 18 of a tire of the oncoming vehicle and the reflection region 3.

FIG. 6(*a*) is a diagram showing a reflection region 4 of regularly reflected light that reaches a windshield of an oncoming vehicle according to a comparative example, and FIG. 6(*b*) is a diagram showing a state where light is turned off for the reflection region 4 of the regularly reflected light according to the comparative example.

FIG. 8(*a*) is a diagram showing turn-off/dimming regions of LEDs 13 arranged in a matrix in a lamp system 100 according to a third embodiment, FIG. 8(*b*) is a diagram showing a light distribution pattern of a left headlamp 10.

DESCRIPTION OF EMBODIMENTS

Embodiments of the present invention will be described below with reference to the drawings.

First Embodiment

A lamp system 100 according to a first embodiment will be described.

Figure 1:
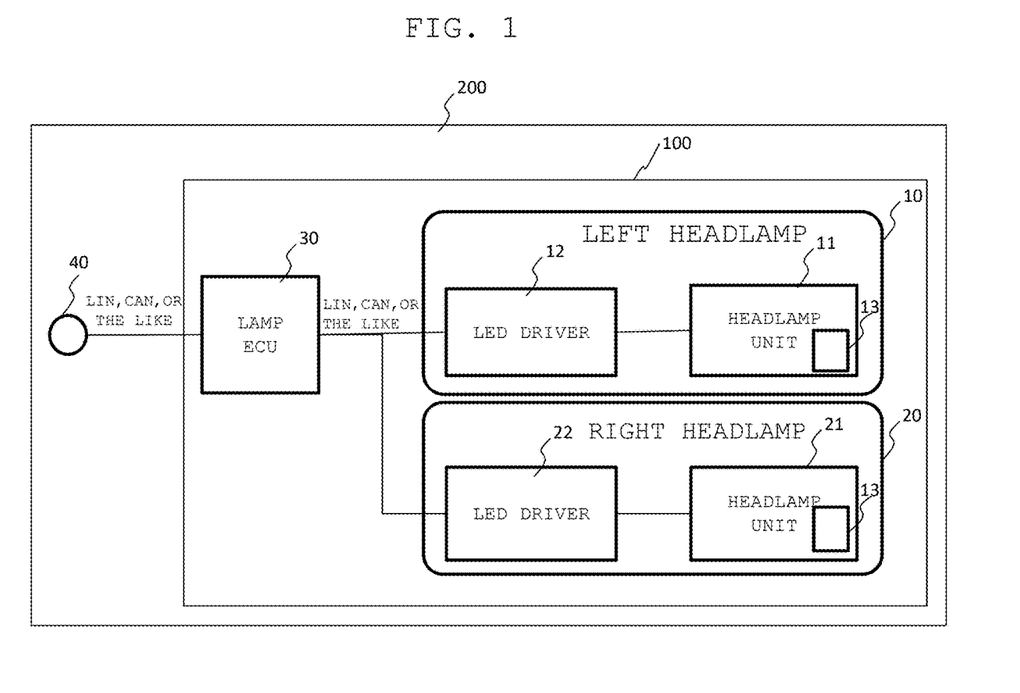
FIG. 1 is a block diagram of a lamp system 100 and a vehicle 200 according to a first embodiment of the present invention.

The lamp system 100 is a headlamp system. As shown in FIG. 1, the lamp system 100 includes a left headlamp 10 and a right headlamp 20, and a lamp engine control unit (ECU) 30 that controls them.

The left headlamp 10 includes a headlamp unit 11 that projects light over a predetermined range, and an LED driver 12 that individually controls a plurality of light emitting devices (LEDs) 13 in the headlamp unit 11 and turns on and turns off or dims a light projection range of the lamp unit 11 in predetermined units. Similarly, the right headlamp 20 includes a headlamp unit 21 and an LED driver 22 that individually controls a plurality of LEDs 13 in the headlamp unit 21.

Figure 2A:
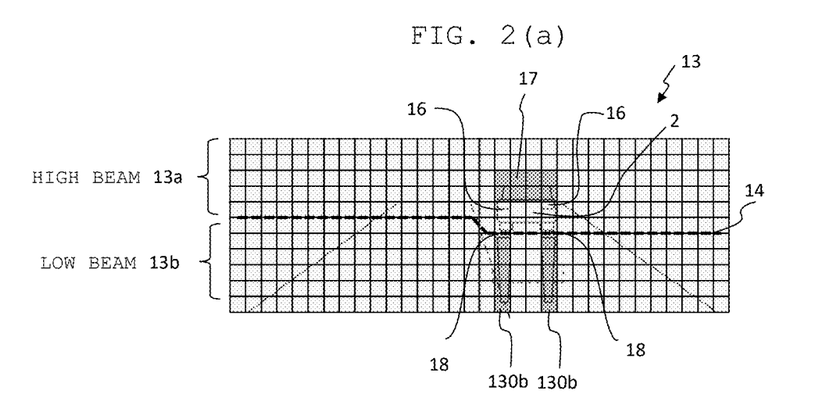

As shown in FIG. 2(a), the LEDs 13 of the left headlamp 10 are arranged vertically and horizontally in a matrix, and light emitted from the matrix-like LEDs 13 is projected in front of a vehicle by an optical lens (not shown). The matrix-like LEDs 13 have cut-off lines 14 having a predetermined shape which are set in the horizontal direction, and LEDs 13a above the cut-off lines 14 project high beams. LEDs 13b below the cut-off lines 14 project low beams.

The LED driver 12 can turn on and turns off or dim both the low-beam LED 13b and the high-beam LED 13a for each predetermined area. The size of a region that can be turned on and turned off or dimmed may correspond to each individual LED 13, or may correspond to a predetermined area unit constituted by a plurality of LEDs 13, as shown in FIG. 2(b).

Figure 2B:
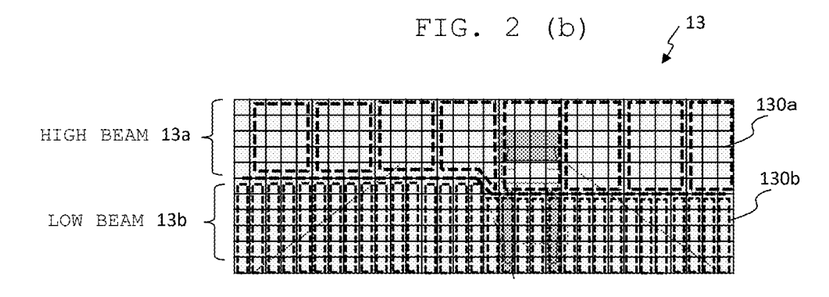

In this embodiment, as shown in FIG. 2(b), an area 130b including a plurality of LEDs 13b arranged vertically in a row is set for each row in the matrix-like LED 13b for a low beam, and the LED driver 12 is configured to be able to turn on and turn off the LEDs 13b for each row. In addition, a vertically elongated LED may be used as the low-beam LED 13b, and one area 130b may be constituted by one LED 13b.

A plurality of areas 130a including a plurality of rows of LEDs 13a are set in the matrix-like LED 13a for a high beam, and the LED driver 12 is configured to be able to turn on and turn off the LEDs 13a in units of multiple rows.

An LED 23 of the right headlamp 20 has the same configuration as the LED 13 of the left headlamp 10. The LED driver 22 has the same configuration as the LED driver 12.

The lamp ECU 30 obtains a reflection region 3 on the road surface where light projected from the lamp unit is regularly reflected and diffusely reflected by the road surface and reaches a driver of an oncoming vehicle, and controls the LED drivers 12 and 22 to turn off or dim the projection of light from the lamp units 11 and 21 to the reflection region 3.

Specifically, the lamp ECU 30 is connected to a sensor 40 including various sensors of a vehicle 200, an on-board camera, a wiper switch, a raindrop recognition device, and the like, and receives an output of the sensor 40. The lamp ECU 30 controls the LED drivers 12 and 22 based on the received output of the sensor 40. That is, the LEDs 13a and 13b are turned off or dimmed in units of the areas 130a and 130b so as not to dazzle a driver of an oncoming vehicle detected by the on-board camera, and the like, based on position information of the oncoming vehicle, thereby realizing an additional function for an adaptive driving beam (ADB).

The headlamp units 11 and 21 are not limited to a configuration including the LEDs 13 arranged in a matrix as described above, as long as they are configured to be able to partially turn off or dim light for projection regions of a low beam and a high beam. It is possible to use other types of systems, such as an LED segment type ADB system that turns on and turns off LEDs disposed only horizontally and performs projection by vertical enlargement with a lens, a liquid crystal display (LCD) headlamp system that turns on and turns off the passage of light for each area with a liquid crystal element by using an LED as a light source to form a light distribution, a system that projects light from a laser light source with an optical lens while performing scanning using a Micro Electro Mechanical Systems (MEMS) mirror to form a light distribution, and a system that projects light of a light source being an LED by using a digital micromirror device (DMD) for moving a large number of micromirrors to form a light distribution.

Hereinafter, processing in which the lamp ECU 30 controls the left headlamp 10 and the right headlamp 20 will be described with reference to a flow in FIG. 3.

The lamp ECU 30 is constituted by a computer or the like equipped with a processor such as a central processing unit (CPU) or a graphics processing unit (GPU) and a memory. The processor reads and executes programs stored in the memory to realize the functions of the lamp ECU 30. A part or the entirety of the lamp ECU 30 can also be constituted by hardware. For example, a circuit design can be performed to realize the functions of the lamp ECU 30 using a custom IC such as an application specific integrated circuit (ASIC) or a programmable IC such as a field-programmable gate array (FPGA).

(Step 101)

First, the lamp ECU 30 captures an image from the on-board camera in the sensor 40 of the vehicle 200.

(Step 102)

When the brightness of the image captured in step 101 is equal to or lower than a predetermined value, the lamp ECU 30 determines that it is nighttime. The lamp ECU 30 may also determine whether it is nighttime from the time of day.

(Step 103)

When the lamp ECU 30 determines in step 102 that it is nighttime, the lamp ECU 30 instructs the LED drivers 12 and 22 to turn on a headlight switch.

(Step 104)

The LED drivers 12 and 22 supply power to all of the LEDs 13 in the headlamp units 11 and 21 to turn on the high-beam LED 13a and the low-beam LED 13b.

(Step 105)

The lamp ECU 30 captures an image from the on-board camera, performs image processing, and determines whether the image includes an oncoming vehicle 2, that is, whether there is the oncoming vehicle 2.

(Step 106)

When there is the oncoming vehicle 2, the lamp ECU 30 processes the image captured by the on-board camera and detects the positions of headlamps (headlights) 16 of the oncoming vehicle 2.

(Step 107)

Figure 4A:
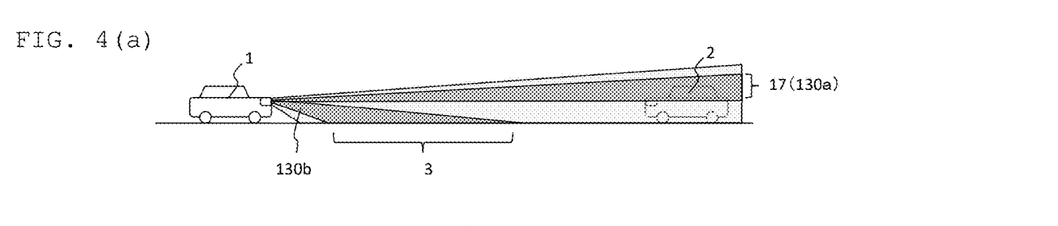
Figure 4B:
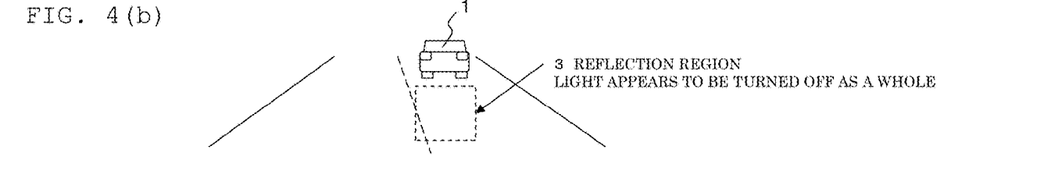

Since a predetermined range above the position of the headlamp 16 of the oncoming vehicle 2 by a predetermined distance is a range 17 of a windshield, the lamp ECU 30 instructs the LED drivers 12 and 22 to turn off or dim light for the range 17 of the windshield. The LED drivers 12 and 22 turns off or dims the LED 13a in the area 130a that includes the range 17 of the windshield (see FIGS. 4(a) and (b)). Thereby, it is possible to prevent high-beam light of a host vehicle 1 from being directly emitted to the range 17 of the windshield of the oncoming vehicle 2 to prevent a driver of the oncoming vehicle 2 from being dazzled.

(Step 108)

Next, the lamp ECU 30 receives an output regarding whether the wiper switch of the sensor 40 is turned on or turned off, and/or an output of the raindrop recognition device that recognizes whether there are raindrops on the windshield. When the wiper switch is turned on or the raindrop recognition device detects raindrops on the windshield, the lamp ECU 30 determines that the road surface is wet. When the road surface is not wet, the lamp ECU 30 returns to step 105.

(Step 109)

When the lamp ECU 30 determines in step 108 that the road surface is wet, the lamp ECU 30 captures an image from the on-board camera, processes the image, and detects the positions of the headlamps (headlights) 16 of the oncoming vehicle 2.

(Step 110)

The lamp ECU 30 calculates a vehicle size from a distance between the two headlamps (headlights) detected in step 109, and calculates grounding positions 18 of tires (front wheels) of the oncoming vehicle 2 from the vehicle size using a predetermined formula, or the like.

(Step 111)

The lamp ECU 30 instructs the LED drivers 12 and 22 to turn off or dim all of one row of LEDs 13b in the area 130b below the LEDs 13b corresponding to the tire grounding positions calculated in step 110. Thereby, the LED drivers 12 and 22 turn off or dim one row of LEDs 13b in the area 130b below the LEDs 13 corresponding to the tire grounding positions 18 as shown in FIGS. 2(a) and (b) (FIG. 4(a)).

Figure 5A:
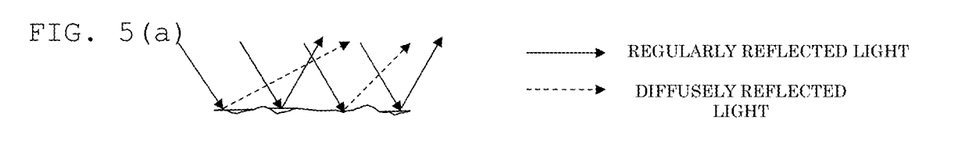
Figure 5B:
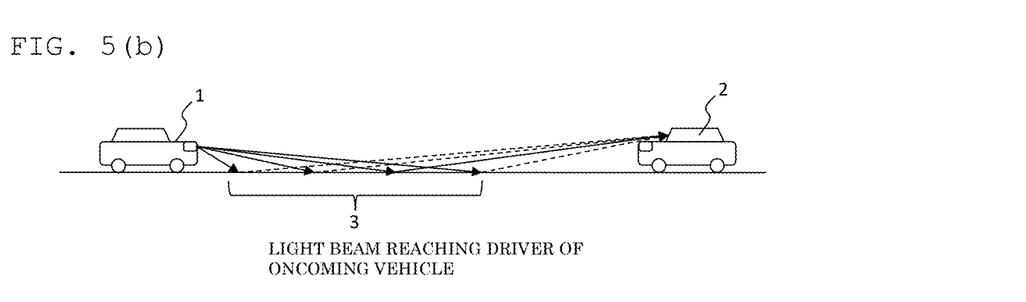
Figure 5C:
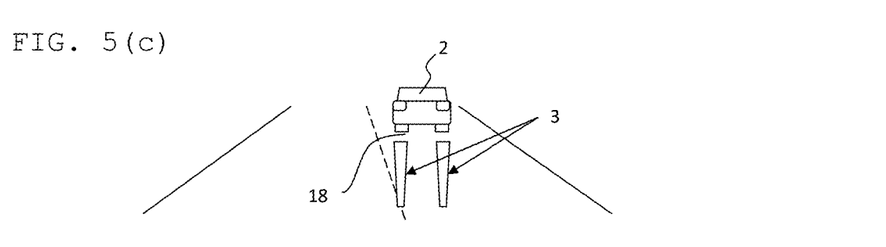
Figure 6A:
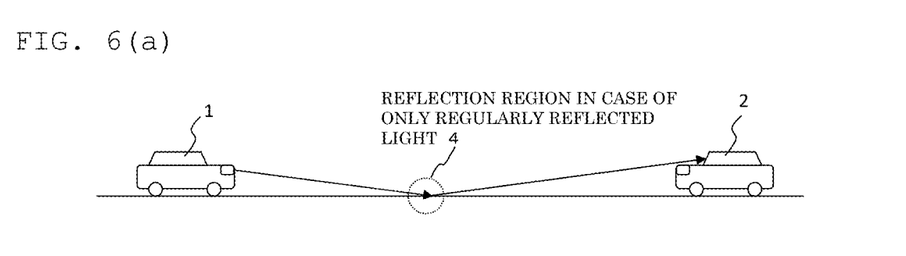
Figure 6B:
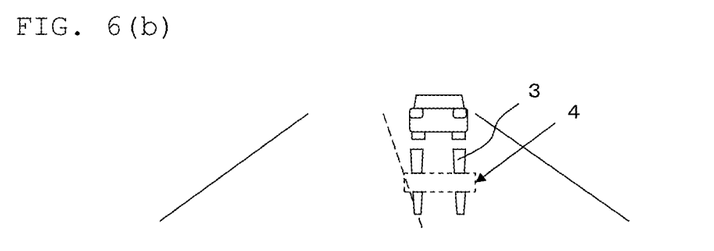

When the amount of rainfall is small, light emitted from the host vehicle 1 to a road surface is not only regularly reflected by the road surface, but also diffusely reflected by irregularities of the road surface as shown in FIG. 5(a). For this reason, the reflection region 3 on the road surface where the light emitted from the host vehicle 1 to the road surface reaches the windshield of the oncoming vehicle 2 by regular reflection and diffuse reflection is longer than a reflection region 4 in the case of only regular reflection and becomes a region such that a tail is drawn on the road surface as shown in FIG. 6(a). For this reason, when the LED 13b corresponding to the reflection region 4 with only regular reflection is turned off, light for only a portion of the reflection region 3 including regular reflection and diffuse reflection can be turned off as shown in FIG. 6(b). On the other hand, in this embodiment, since one row of LEDs 13b in the area 130b below the LEDs 13 corresponding to the tire grounding positions 18 are turned off to prevent light from being emitted to the reflection region 3 including regular reflection and diffuse reflection, the driver of the oncoming vehicle 2 cannot view either regularly reflected light or diffusely reflected light from the road surface as shown in FIGS. 4(a) and (b), and light appears to be turned off as a whole, and thus the driver is not dazzled.

(Step 112)

The lamp ECU 30 captures an image from the on-board camera and processes the image again to determine whether there is an oncoming vehicle. When there is an oncoming vehicle, the lamp ECU 30 returns to step 108 and repeats steps 108 to 111. Thereby, the headlights of the oncoming vehicle 2 approaching the host vehicle 1 are detected, and one row of LEDs 13b in the area 130b below the LEDs 13 corresponding to the tire grounding positions 18 are turned off. Thus, it is possible to prevent light from being emitted to the reflection region 3 including regular reflection and diffuse reflection in accordance with changes in the size and position of the approaching oncoming vehicle 2 and to prevent the driver of the oncoming vehicle 2 from being dazzled due to regularly reflected light and diffusely reflected light on the road surface.

When the lamp ECU 30 determines that there is no oncoming vehicle (no oncoming vehicle has passed), the lamp ECU 30 proceeds to step 113.

(Step 113)

The lamp ECU 30 determines whether it is still nighttime as in step 102, and when it is still nighttime, the lamp ECU 30 returns to step 105 and repeats steps 105 to 112. When it is no longer nighttime (dawn), the lamp ECU 30 proceeds to step 114.

(Step 114)

The lamp ECU 30 instructs the LED drivers 12 and 22 to turn off the headlights. The LED drivers 12 and 22 turn off the entire lamp units 11 and 12.

In this manner, according to the first embodiment, when it is raining, it is possible to prevent light from being emitted to the linear reflection region 3 closer to the host vehicle 1 than the tire grounding positions 18 of the oncoming vehicle 2. Thereby, it is possible to prevent not only regularly reflected light but also light diffusely reflected by the irregularities of the road surface from reaching the driver of the oncoming vehicle 2, and thus the driver of the oncoming vehicle 2 is not dazzled.

Second Embodiment

A lamp system 100 according to a second embodiment will be described.

The lamp system 100 according to the second embodiment detects a reflection region 3 due to regular reflection and diffuse reflection by detecting a high-brightness reflection region on a road surface irradiated with light by a headlamp of an oncoming vehicle 2 using an on-board camera of a host vehicle 1. An LED 13 corresponding to the reflection region 3 is turned off in response to a command from a lamp ECU 30. The other configurations and processing are the same as those in the first embodiment, and thus only processing different from the first embodiment will be described using a flow of FIG. 7.

(Steps 101 to 108)

Figure 3:
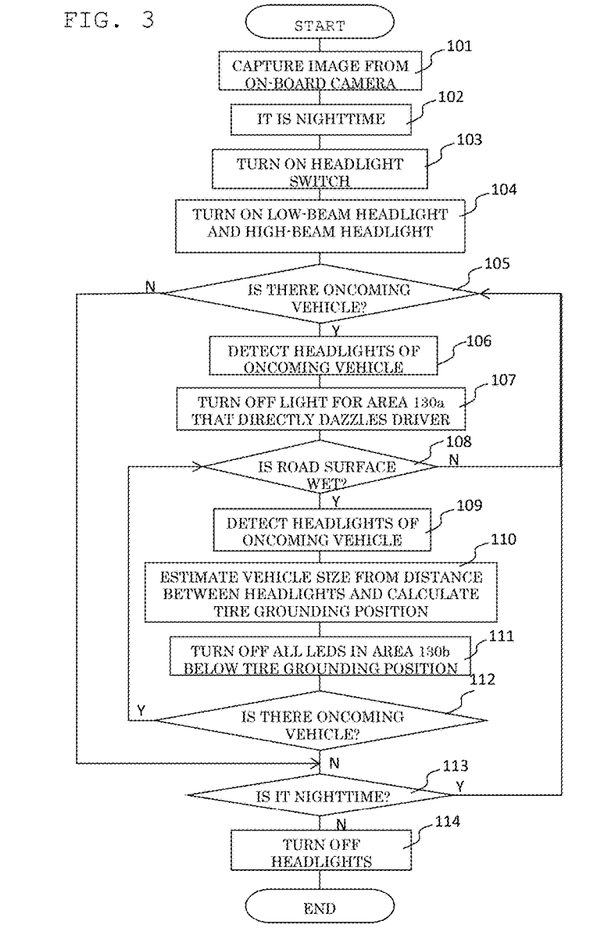
FIG. 3 is a flowchart showing operations of the lamp system 100 according to the first embodiment.
Figure 7:
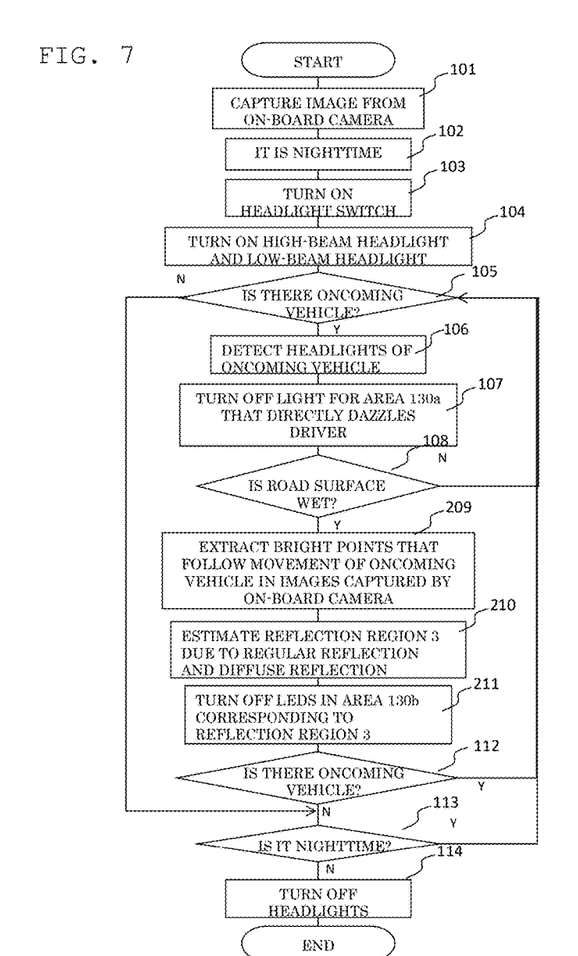
FIG. 7 is a flowchart showing operations of a lamp system 100 according to a second embodiment.

Steps 101 to 108 are the same as steps 101 to 108 in the flow of FIG. 3 in the first embodiment, and the lamp ECU 30 turns on headlights at night and turns off light for an area 130a of an LED 13a that emits light directly incident on the windshield of the oncoming vehicle. The lamp ECU 30 also determines whether the road surface is wet, and when the road surface is wet, the lamp ECU 30 proceeds to step 209.

(Step 209)

The lamp ECU 30 captures images by the on-board camera in time series and performs image processing to extract bright spots that follow the movement of the oncoming vehicle 2.

(Step 210)

The lamp ECU 30 estimates the range of the bright spots extracted in step 209 as the reflection region 3 due to regular reflection and diffuse reflection.

In step 209, the bright spots that follow the movement of the oncoming vehicle 2 are extracted, and thus it is possible to eliminate bright spots caused by light of street lamps and the like which is reflected from a road surface and to extract the reflection region 3 where light of the headlights of the oncoming vehicle 2 is regularly reflected and diffusely reflected by the road surface.

(Step 211)

The lamp ECU 30 instructs LED drivers 12 and 22 to turn off LEDs 13b in an area 130b corresponding to the reflection region 3 estimated in step 210. The LED drivers 12 and 22 turn off the LEDs 13b in the areas 130b of lamp units 11 and 21.

When the area 130b is set for each LED 13b, the LEDs 13b corresponding to the reflection region 3 are turned off. In this case, the lamp ECU 30 may directly instruct the LED drivers 12 and 22 on turn-off areas, or the LED drivers 12 and 22 may receive an operation instruction from the lamp ECU 30, determine the LEDS 13b corresponding to the reflection region 3 by calculation, and turn off the LEDs.

In this manner, in step 211, light can be prevented from being emitted to the reflection region 3 that includes both regular reflection and diffuse reflection, and thus the driver of the oncoming vehicle 2 cannot view both regularly reflected light and diffusely reflected light from the road surface, and light appears to be turned off as a whole, and thus the driver is not dazzled.

(Steps 112 to 114)

Steps 112 to 114 are the same processing as in the first embodiment, and thus the description thereof will be omitted.

As described above, in the second embodiment, the on-board camera detects high-brightness points of reflected light of the oncoming vehicle 2 to obtain the reflection region 3 where light emitted by the headlights of the host vehicle 1 is reflected on the road surface and becomes glare for the oncoming vehicle. The host vehicle 1 and the oncoming vehicle 2 are in different positions, but considered to be under almost homogeneous road surface conditions. Thus, the reflection region 3 of the host vehicle 1 can be estimated by detecting high-brightness points of light emitted by the oncoming vehicle 2.

Third Embodiment

A lamp system according to a third embodiment will be described.

In the first embodiment, light for the two areas 130b corresponding to the reflection region 3 is turned off based on the grounding positions 18 of the two tires (front wheels) of the oncoming vehicle 2, but in the third embodiment, light for only a side close to a driver is turned off.

Figure 8A:
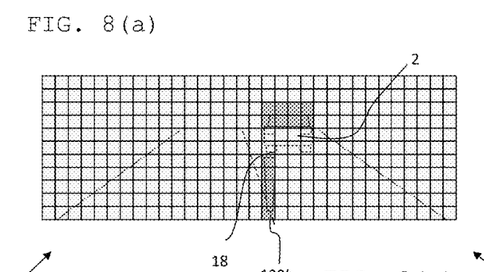

Specifically, as shown in FIG. 8(a), in the third embodiment, when an oncoming vehicle 2 and a host vehicle 1 are right-hand drive vehicles, light for one area 130b corresponding to a reflection region 3 below a grounding position 18 of a right tire (front wheel) of the oncoming vehicle 2, where reflected light reaches and dazzles a driver of the oncoming vehicle 2, is turned off. In the third embodiment, in countries such as Japan where people drive on the left side of the road, there are many right-hand drive vehicles, and thus turning off light for the area 130b below the right tire (front wheel) of the oncoming vehicle 2 is effective in preventing glare. However, in countries such as Europe and the US where people drive on the right side of the road, there are many left-hand drive vehicles, and thus switching control to turn off light for the area 130b below the left tire (front wheel) of the oncoming vehicle 2 is more effective in preventing glare for the driver of the oncoming vehicle 2. Alternatively, when control is performed to turn off light for the area 130b below the tire of the oncoming vehicle which is closer to the center lane, it is possible to generally avoid giving glaring light to drivers, regardless of whether they drive on the left side or the right side of the road.

Thereby, a region for which light is turned off and which is not irradiated with the headlights is smaller than in the first embodiment, making it easier for a driver of the host vehicle 1 to view the road conditions in front of the vehicle and to drive.

Figure 8B:
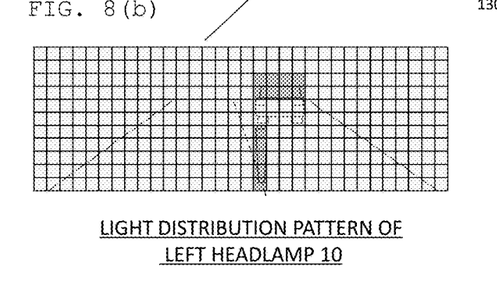
Figure 8C:
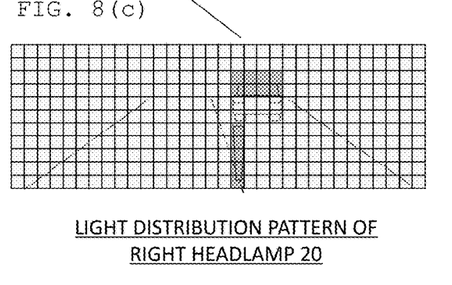
FIG. 8(c) is a diagram showing a light distribution pattern of a right headlamp 20.

FIG. 8(b) shows a light distribution pattern of a left headlamp 10, and FIG. 8(c) shows a light distribution pattern of a right headlamp 20. An irradiation area of the light distribution pattern in FIG. 8(b) and an irradiation area of the light distribution pattern in FIG. 8(c) overlap each other, thereby obtaining a light distribution pattern in FIG. 8(a). However, actually, light distribution patterns for a target do not match completely due to a difference in the positions of the left and right lamps, and angles differ accordingly in right and left directions. In this case, when the positions of the oncoming vehicle are correctly specified from the positions of the left and right lamps, respectively, in the front direction of the vehicle, and the two positions are superimposed on each other, a light distribution pattern similar to that in FIG. 8(a) is obtained.

Fourth Embodiment

Figure 9:
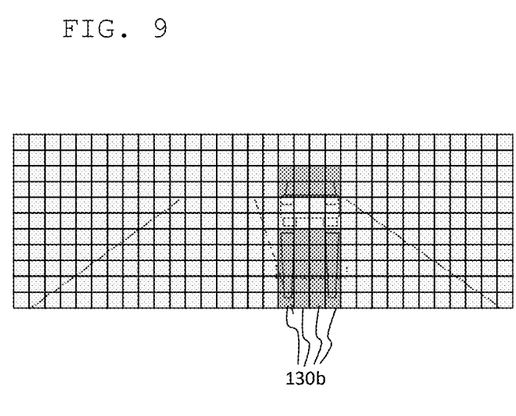
FIG. 9 is a diagram showing turn-off/dimming regions of LEDs 13 arranged in a matrix in a lamp system 100 according to a fourth embodiment.

A lamp system according to a fourth embodiment will be described with reference to FIG. 9.

In the first embodiment, light for the two areas 130b corresponding to the reflection region 3 is turned off based on the grounding positions 18 of the two tires (front wheels) of the oncoming vehicle 2. However, in the fourth embodiment, light for an area 130b between two areas 130b is also turned off as shown in FIG. 9. In an example shown in FIG. 9, light for three areas 130b is turned off.

Thereby, a case where the position of the face of a driver of an oncoming vehicle 2 is deviated and glaring light entering through a windshield are almost prevented, and thus all passengers in the oncoming vehicle 2 are prevented from being dazzled.

Fifth Embodiment

A lamp system according to a fifth embodiment will be described with reference to FIG. 10.

In the fifth embodiment, areas for which light is to be turned off are the same as those in the first embodiment.

Figure 10A:
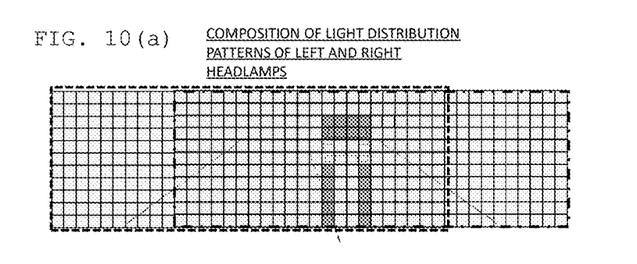
FIG. 10(a) is a diagram showing turn-off/dimming regions of LEDs 13 arranged in a matrix in a lamp system 100 according to a fifth embodiment.
Figure 10B:
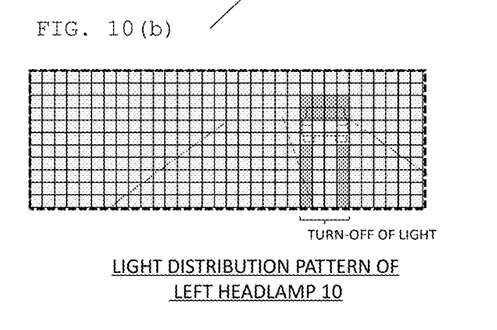
FIG. 10(b) is a diagram showing a light distribution pattern of a left headlamp 10.
Figure 10C:
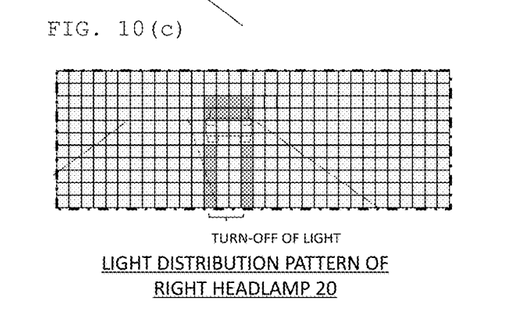
FIG. 10(c) is a diagram showing a light distribution pattern of a right headlamp 20.

However, a light distribution pattern of a left headlamp 10 shown in FIG. 10(b) and a light distribution pattern of a right headlamp 20 shown in FIG. 10(c) are projected such that only regions closer to the center overlap each other, and a configuration in which headlights emit light over a wide range in the right-left direction as shown in FIG. 10(a) is adopted.

For this reason, a turn-off position of the left headlamp is on the right side as shown in FIG. 10(b), and a turn-off position of the right headlamp is on the left side as shown in FIG. 10(c).

In this manner, even when a light distribution pattern of the entirety is generated by superimposing only parts of the light distribution patterns of the left and right headlights on each other, it is possible to implement a glare countermeasure similar to that in the first embodiment by adjusting the turn-off positions of the right and left headlights in accordance with the position of an oncoming vehicle.

Sixth Embodiment

Although a configuration in which the driver of the oncoming vehicle 2 is not dazzled has been described in the first to fifth embodiments, it can also be applied to a preceding vehicle.

Specifically, a lamp ECU 30 detects rear lamps of a preceding vehicle from an image captured by an on-board camera, calculates grounding positions of tires (rear wheels) of the preceding vehicle, and turns off light for areas 130b, as in the first embodiment.

Alternatively, the lamp ECU 30 estimates a reflection region of the rear lamp on a road surface based on a brightness point of an image captured by the on-board camera or the like and turns off light for the corresponding area 130b as in the second embodiment.

In this manner, in the configuration in the sixth embodiment, it is possible to prevent light of headlamps of a following vehicle from being regularly reflected and diffusely reflected on a rear road surface viewed by a driver of the preceding vehicle through a rear-view mirror, thereby preventing the driver of the preceding vehicle from being dazzled.

Seventh Embodiment

A lamp system according to a seventh embodiment will be described with reference to FIG. 11.

In the lamp system according to the seventh embodiment, instead of the matrix-like LEDs 13 in the first to sixth embodiments, a system that irradiates a phosphor with light from a laser light source while performing scanning using a Micro Electro Mechanical Systems (MEMS) mirror, projects fluorescence emitted by the phosphor using an optical lens, and forms a light distribution is used. The other configurations are the same as those in the first to sixth embodiments.

Figure 11:
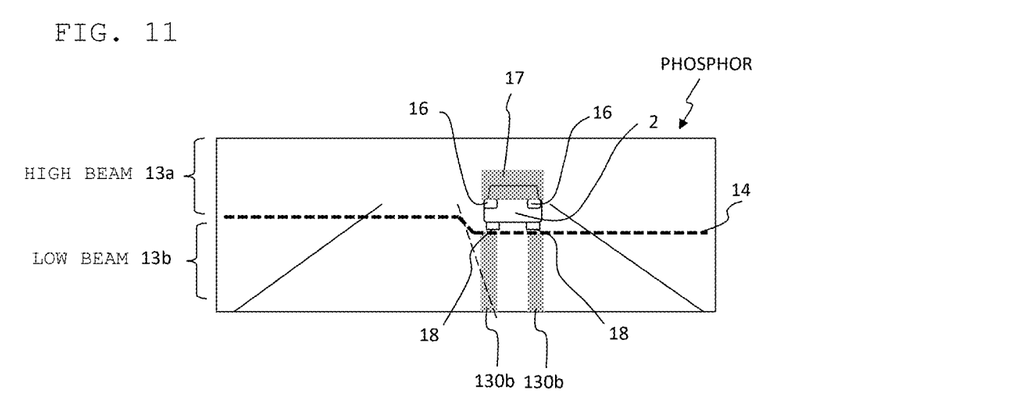
FIG. 11 is a diagram showing the shape of a phosphor in a light distribution system using a Micro Electro Mechanical Systems (MEMS) mirror of a lamp system according to a seventh embodiment.

FIG. 11 shows a rectangular plate-like or layer-like phosphor used in a system that projects light from a laser light source by using an optical lens while performing scanning using a Micro Electro Mechanical Systems (MEMS) mirror and forms a light distribution. The phosphor in FIG. 11 is a uniform plate-like or layer-like phosphor that is not divided into sections such as for each light emitting device, unlike the matrix-like light emitting devices (LED 13) in the first to sixth embodiments. Thus, since the phosphor emits light continuously when irradiated with laser light, it is possible to seamlessly draw a road surface.

In the lamp system according to the seventh embodiment, regions for which light is to be turned off or dimmed are the same as those in the first to sixth embodiments. In the case of a light distribution system using the MEMS mirror according to this embodiment, a laser light source is turned off or dimmed in a reflection region 3 and a region of a range 17 of a windshield. Thereby, it is possible to prevent not only regularly reflected light but also light that is diffusely reflected by irregularities of a road surface from reaching a driver of an oncoming vehicle 2 as in the first embodiment, and thus the driver of the oncoming vehicle 2 is not dazzled.

With the lamp system using the MEMS mirror according to the seventh embodiment, it is possible to reproduce the reflection regions in the second to sixth embodiments.

Eighth Embodiment

A lamp system according to an eighth embodiment will be described with reference to FIG. 12.

In the lamp system according to the eighth embodiment, instead of the matrix-like LEDs 13 in the first to sixth embodiments, an LCD headlamp system that turns on and turns off the passage of light for each area with a liquid crystal element by using an LED as a light source to form a light distribution is used. The other configurations are the same as those in the first to sixth embodiments.

Figure 12:
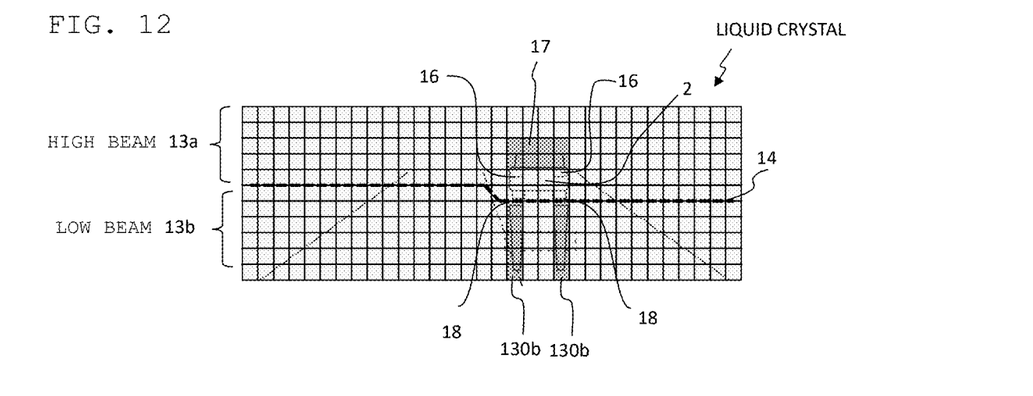
FIG. 12 is a diagram showing a liquid crystal element of a liquid crystal display (LCD) headlight system of a lamp system according to an eighth embodiment.

FIG. 12 shows a liquid crystal element in an LCD headlamp system that turns on and turns off the passage of light for each area with a liquid crystal element by using an LED as a light source to form a light distribution. The liquid crystal element is divided in the same manner as the matrix-like light emitting device in the first embodiment.

In the lamp system according to the eighth embodiment, regions for light is to be turned off or dimmed are the same as those in the first to sixth embodiments. In the case of the LCD headlamp according to this embodiment, light is dimmed in a reflection region 3 and a region of a range 17 of a windshield by turning off the liquid crystal or lowering a voltage applied to the liquid crystal element. Thereby, it is possible to prevent not only regularly reflected light but also light that is diffusely reflected by irregularities of a road surface from reaching a driver of an oncoming vehicle 2 as in the first embodiment, and thus the driver of the oncoming vehicle 2 is not dazzled.

With the LCD headlamp system according to the eighth embodiment, it is possible to reproduce the reflection regions in the second to sixth embodiments.

<<<Application to Products>>>

The lamp system according to this embodiment can be used in automobile headlamps.

REFERENCE SIGNS LIST

1: host vehicle
2: oncoming vehicle
3: reflection region

4: reflection region
10: left headlamp
11: lamp unit
12: LED driver
14: cut-off line
16: headlamp
17: range
18: tire grounding position
20: right headlamp
21: headlamp unit
22: LED driver
30: lamp ECU
40: sensor
100: lamp system
130a: area
130b: area
200: vehicle

The invention claimed is:

1. A lamp system comprising:
a lamp unit that projects light over a predetermined range;
a driver that turns on and turns off or dims a light projection range of the lamp unit in predetermined units; and
a control unit that controls the driver, wherein
the control unit obtains a reflection region on a road surface where the light projected from the lamp unit is regularly and diffusely reflected by the road surface and reaches a driver of an oncoming vehicle or a preceding vehicle, and controls the driver so that the light projected onto the reflection region from the lamp unit is turned off or dimmed, wherein
the control unit processes an image obtained by capturing the oncoming vehicle or the preceding vehicle to obtain grounding positions of front wheels of the oncoming vehicle or grounding positions of rear wheels of the preceding vehicle, sets a predetermined range on the road surface from the grounding positions as the reflection region, and turns off or dims the light projected onto the reflection region from the lamp unit.

2. The lamp system according to claim 1, wherein
the lamp unit includes light emitting devices arranged vertically and horizontally in a matrix, the matrix-like light emitting devices have a region of a plurality of light emitting devices that emit a high beam and a region of a plurality of light emitting devices that emit a low beam,
an area including a plurality of light emitting devices that are vertically arranged in a row is set for each row in the region of the plurality of light emitting devices that emit a low beam, and
the driver turns on and turns off or dims the light projection range with the area as the unit.

3. The lamp system according to claim 1, wherein
the lamp unit includes light emitting devices arranged vertically and horizontally in a matrix, the matrix-like light emitting devices have a region of a plurality of light emitting devices that emit a high beam and a region of a plurality of vertically elongated light emitting devices that emit a low beam,
an area including vertically elongated light emitting devices in a row is set for each row in the region of the plurality of light emitting devices that emit a low beam, and
the driver turns on and turns off or dims the light projection range with the area as the unit.

4. The lamp system according to claim 1, wherein
the lamp unit includes liquid crystal elements arranged vertically and horizontally in a matrix, the matrix-like liquid crystal elements have a region of a plurality of liquid crystal elements that emit a high beam and a region of a plurality of liquid crystal elements that emit a low beam,
an area including a plurality of liquid crystal elements arranged vertically in a row is set for each row in the region of the plurality of liquid crystal elements that emit a low beam, and
the driver turns on and turns off or dims the light projection range with the area as the unit.

5. The lamp system according to claim 1, wherein
the control unit turns off or dims the light projected onto the reflection region from the lamp unit when the road surface is wet.

6. The lamp system according to claim 1, wherein
the control unit sets a predetermined range on the road surface from the grounding position of one of the front wheels of the oncoming vehicle which is close to the driver of the oncoming vehicle, among the grounding positions of the front wheels of the oncoming vehicle, as the reflection region.

7. The lamp system according to claim 1, wherein
the control unit turns off or dims the projected light not only for the reflection regions of the grounding positions of the two front wheels of the oncoming vehicle, but also for a region between the reflection regions.

8. A vehicle equipped with the lamp system according to claim 1.

9. A vehicle according to claim 8, wherein
the control unit includes a processor and a memory, and
the control unit detects positions of two lamps from the image and determines the grounding position based on a distance between the two detected lamps.

10. A lamp system comprising:
a lamp unit that projects light over a predetermined range;
a driver that turns on and turns off or dims a light projection range of the lamp unit in predetermined units; and
a control unit that controls the driver, wherein
the control unit obtains a reflection region on a road surface where the light projected from the lamp unit is regularly and diffusely reflected by the road surface and reaches a driver of an oncoming vehicle or a preceding vehicle, and controls the driver so that the light projected onto the reflection region from the lamp unit is turned off or dimmed, wherein
the lamp unit includes a phosphor that emits fluorescence when seamlessly scanned with laser light vertically and horizontally, the phosphor has a phosphor region for emitting a high beam and a phosphor region for emitting a low beam,
a plurality of areas for realizing light emission, which are arranged vertically in a row, are set for each row in the phosphor region for emitting a low beam, and
the driver turns on and turns off or dims the light projection range with the area as the unit.

11. The lamp system according to claim 10, wherein
the control unit processes an image obtained by capturing the oncoming vehicle or the preceding vehicle to obtain high-brightness points from a host vehicle equipped with the lamp unit, obtains the reflection region on the road surface based on the high-brightness points, and turns off or dims the light projected onto the reflection region from the lamp unit.

12. A vehicle equipped with the lamp system according to claim 10.

* * * * *